United States Patent [19]

Nowlin

[11] 4,097,999
[45] Jul. 4, 1978

[54] ANGLE GAUGE

[76] Inventor: William E. Nowlin, 961 E. 21st Ave., Columbus, Ohio 43211

[21] Appl. No.: 756,130

[22] Filed: Jan. 3, 1977

Related U.S. Application Data

[63] Continuation-in-part of Ser. No. 665,424, Mar. 10, 1976, abandoned.

[51] Int. Cl.² ............................................. B43L 7/00
[52] U.S. Cl. ..................................... 33/75 R; 33/113; 33/120
[58] Field of Search ....... 33/174 N, 75, 1 N, 115–120, 33/113, 111, 99, 100, 88, 343, 342

[56] References Cited

U.S. PATENT DOCUMENTS

| | | | |
|---|---|---|---|
| 761,272 | 5/1904 | Wagniere et al. | 33/118 |
| 1,128,673 | 2/1915 | Foner | 33/99 |
| 1,975,648 | 10/1934 | Poulsen | 33/79 R |
| 2,023,539 | 12/1935 | Packard | 33/75 R |
| 2,735,185 | 2/1956 | Naphtal | 33/120 |
| 3,173,214 | 3/1965 | Daller | 33/75 R |

FOREIGN PATENT DOCUMENTS

| | | | |
|---|---|---|---|
| 1,221,713 | 6/1960 | France | 33/75 R |

Primary Examiner—Richard E. Aegerter
Assistant Examiner—John W. Shepperd
Attorney, Agent, or Firm—Frank H. Foster

[57] ABSTRACT

A device capable of gauging angles in the full range from 0° to 360°. The angle gauge has a pair of pivotally connected gauging arms. Each gauging arm is formed by a generally radially outwardly extending leg connected at one end to the pivot axis and a radially offset straight edge leg extending generally laterally from the opposite end of the radial leg. A full 360° angle scale is fixed relative to one of the gauging arms coaxially with the pivot axis and extends radially outwardly a distance less than the offset of the straight edge. A pointer is fixed relative to the other gauging arm as a reading indicator operably associated with the scale. The arms may be clamped in selected angular positions and also may be used to lay out several angles about a common vertex.

One of the gauging arms has a pitch scale formed along it and the other arm has an indicator mark formed on it. The intersection of the pitch scale with the edge of the arm not having the pitch scale occurs at the tangent of the angle on the angle scale which is in registration with the indicator mark.

2 Claims, 8 Drawing Figures

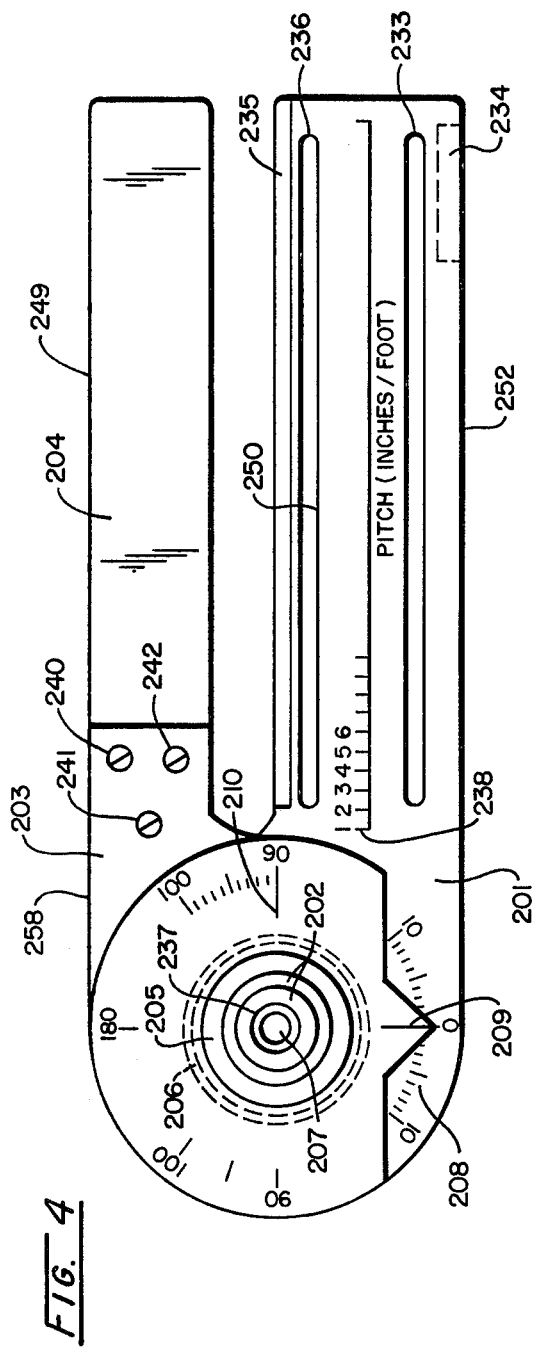
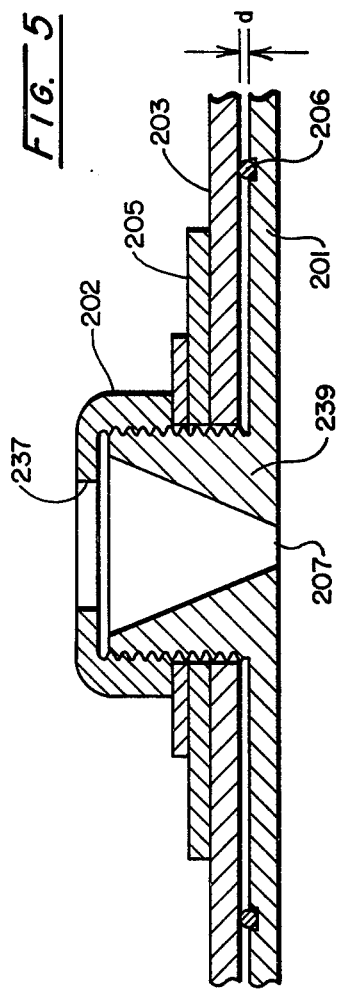

ANGLE GAUGE

BACKGROUND OF THE INVENTION

This application is a continuation in part of my application Ser. No. 665,424 filed Mar. 10, 1976, now abandoned.

This invention relates generally to a device for gauging angles. More particularly, the invention relates to a device for gauging the angle between two intersecting, planar surfaces and which is particularly useful as a carpenters mitering tool.

There are a variety of devices for gauging angles. Such devices are used in carpentry, in gauging machined tapers, in gauging the pitch of airplane propellers and the like. However, these devices are usually intended for particular purposes and to applicant's knowledge inherently have a limited range of useful operation. Such devices have an angular range in which they can not gauge angles.

Most angle gauges are provided with a scale covering only a limited angular range, most often from 0° to 90°. Other gauges have scales extending from 0° to 180°. They do not, however, offer scales operably extending all of the way from 0° to 360°.

In addition, applicant has observed that such prior art devices could not operate over the full range of angles even if their scales were continued or extended to a full 360° in view of applicant's suggestion of the need for such a device.

If the scales of the prior art devices were continued or extended to a full 360° then such modified devices could not be fitted against intersecting planar surfaces. The scales of such prior art devices are arranged so that they would interfere with the apex of the intersecting surfaces being measured and would not permit the gauging straight edges to be aligned along the two intersecting surfaces.

There is therefore a need for an angle gauge which may conveniently be used in mitering and which additionally can gauge angles over the full range from 0° to 360°.

SUMMARY OF THE INVENTION

The invention is an angle gauge comprising a pair of pivotally connected gauging arms, each arm being formed with an outwardly facing straight edge spaced radially offset from the pivot axis. An angle scale is fixed relative to a first one of the arms coaxially with the pivot axis and extends radially outwardly a distance not greater than the least offset of the straight edges. A pointer is fixed relative to the second one of the gauging arms and pivotal with said second arm about said pivot axis for indicating a scale reading.

One of the gauging arms has a pitch scale formed along it and the other arm has an indicator mark formed on it. The intersection of the pitch scale with the edge of the arm not having the pitch scale occurs at the tangent of the angle on the angle scale which is in registration with the indicator mark.

It is therefore an object of the invention to provide an improved angle gauge.

Another object of the invention is to provide an angle guage which works efficiently, comfortably and easily with the types of intersecting planar surfaces commonly encountered by a carpenter.

Another object of the invention is to provide an angle gauge which effectively gauges angles over the full range from 0° to 360°.

Another object of the invention is to alternatively provide an angle gauge for use in mitering in which the indicia on the gauge directly read an angle which is one-half the actual angle being gauged.

Still another object of the invention is to provide an angle gauge which can be inexpensively manufactured and therefore be made available to the public at a reasonable cost.

Further objects and features of the invention will be apparent from the following specification and claims when considered in connection with the accompanying drawings illustrating the preferred embodiments of the invention.

DESCRIPTION OF THE DRAWINGS

FIG. 4 is a top plan view of an angle gauge embodying the pitch scale features of the present invention.

FIG. 5 is a view in vertical section showing some of the assembly features of the present invention.

Figure 1:
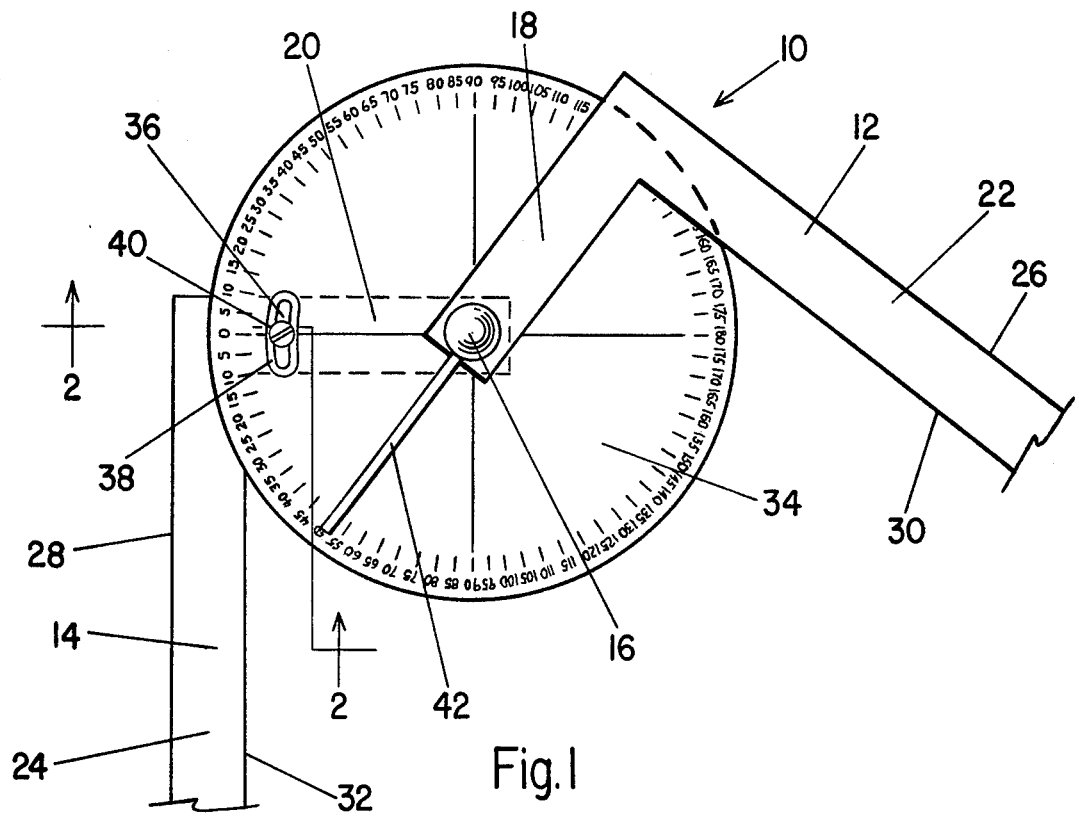
FIG. 1 is a plan view of a preferred embodiment of the invention.

In describing the preferred embodiment of the invention illustrated in the drawings, specific terminolgoy will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

Figure 2:
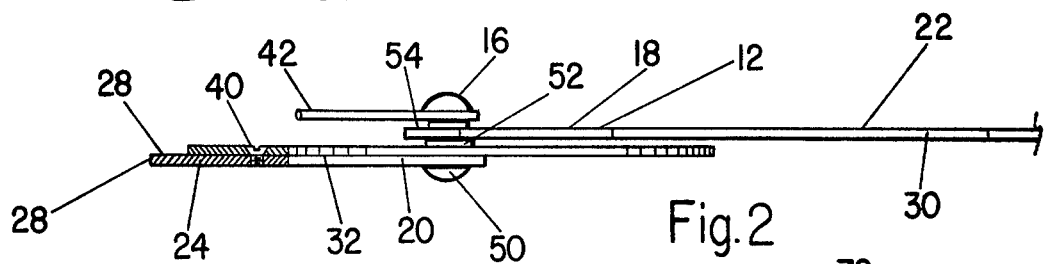
FIG. 2 is a view in side elevation of the embodiment illustrated in FIG. 1.

FIGS. 1 and 2 illustrate an angle gauge 10 embodying the present invention. This angle gauge 10 has a pair of gauging arms 12 and 14 which are pivotally connected for relative pivotal movement about a common axis of rotation. Each of these gauging arms 12 and 14 are formed by generally, radially outwardly extending legs 18 and 20 respectively connected at one end to a pivot pin 16 which forms the axis of relative rotation of the gauging arms 12 and 14. Each of these gauging arms 12 and 14 also has straight edge legs 22 and 24 respectively extending laterally from the opposite end of its associated radial leg 18 and 20 respectively.

Outwardly facing straight edges 26 and 28 are formed on the respective straight edge legs at a position radially offset from the pivot axis of the pivot pin 16.

The gauging arms 12 and 14 are oriented so that when their radial legs 18 and 20 are approximately in overlaid alignment, their straight edge legs 22 and 24 extend in opposite directions. Preferably, inwardly facing straight edges 30 and 32 are also formed along the interior sides of the offset, lateral straight edge legs 22 and 24. The gauge, therefore, would also be useful if the gauging arms were oriented so that they could be pivoted into entirely coextensive, overlapping relationship.

A full 360° circular angle scale 34 is fixed relative to the gauging arms 14 coaxially with the pivot pin 16. The scale 34 extends radially outwardly a distance not greater than the least offset of the straight edges 26 and 28 from the axis of pivot pin 16. Thus, it is important to the present invention that the distance from the axis of the pivot pin 16 radially outwardly to the periphery of the angle 34 be no greater than the radial distance from the axis of the pin 16 to the outwardly facing straight edge 26 or 28 of either gauging arm 12 or gauging arm 14. By maintaining the outer periphery of the scale 34 coextensive or inwardly of these straight edges 26 and 28, the straight edges are always free to seat against each of two intersecting surfaces without interference from the scale 34.

In order to make the scale circularly adjustable for calibration of the device, an arcuate slot 36 having a downwardly tapering upper shoulder 38 may be formed in the scale. A flat head machine screw 40, which is threadedly engaged into a threaded bore in the gauging arm 14, extends through the slot with the tapered underside of the head of the screw seating against the tapered shoulder 38. In this manner, screw 40 may be slightly unscrewed permitting adjustable rotation of the scale 34 into calibration and subsequent tightening of this screw 40 thereby fixing the scale 34 in a calibrated position.

A dial needle or pointer 42 is fixed relative to the other gauging arm 12 and is pivotable therewith about the pivot axis of pivot pin 16. The pointer 42 provides an indicator for reading the angle scale 34.

FIG. 2 illustrates in more detail the coaxial connection of the parts of the preferred embodiment 10 of the invention. The device may, for example, be pivotally connected by means of a rivet 50 having a smooth washer 52 operating as a bearing to permit relative movement between the gauging arm 12 and the scale 34 while maintaining them in a slightly spaced relationship in order to avoid any destruction friction with or rubbing of the scale. A locking washer 54 may be interposed between the gauging arm 12 and the pointer 42 to lock them together and prevent pivotal movement of one relative to the other.

The operation of the preferred embodiment of the invention may begin, for example, with the accurate initial adjustment or calibration of the scale. For this purpose, the gauging arms may be aligned along a known angle. For example, if a carpenter's square is available the arms can be seated against its interior edges. Alternatively, the gauge can be laid along a straight line and adjusted to exactly 180°. In any case, with the straight edges 26 and 28 pivoted into contact against the intersecting surfaces of a known angle, the screw 40 may be loosened. The scale 34 is then rotated until the indicium appearing adjacent the end of the pointer 43 indicates the angle of the intersecting surfaces. The screw 40 is then tightened in that position and in this simple manner the gauge is calibrated for all angles.

It should of course be understood that multiple scales of indicia may be used with the graduations on the scale 34. For example, two circular oppositely ascending series of indicia can be used permitting angles to be read directly in minimum angles. Thus, for example, 270° may be read as 90°. An addition scale, reading directly in the bisector angle can also be included.

Figure 3:
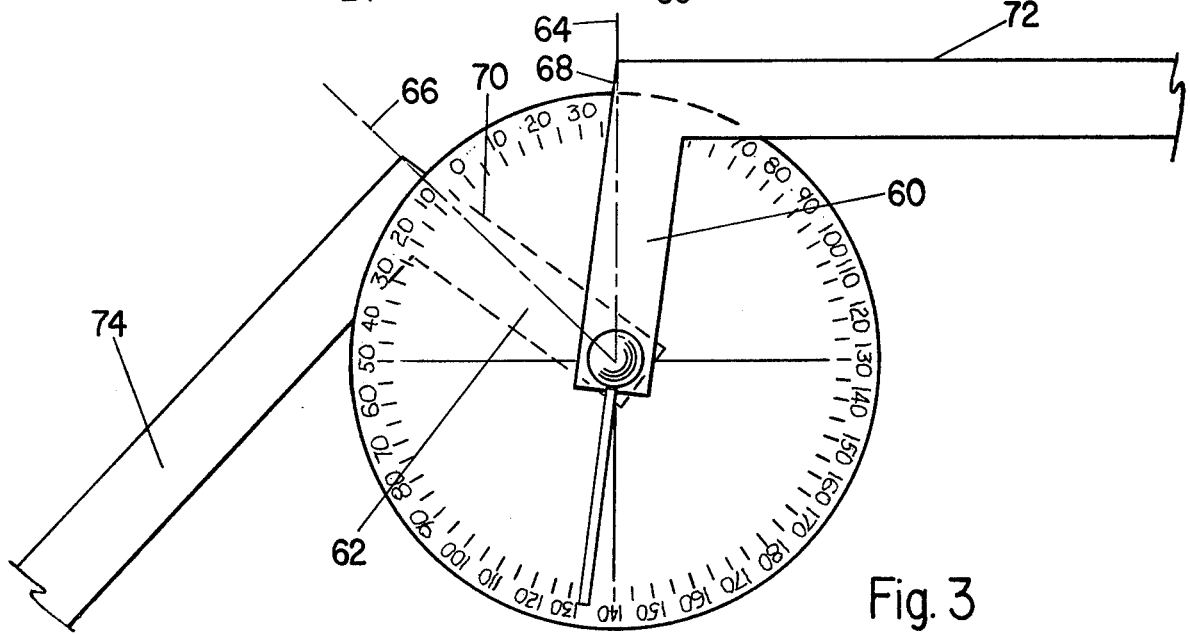
FIG. 3 is a plan view of an alternative embodiment of the invention.
Figure 6:
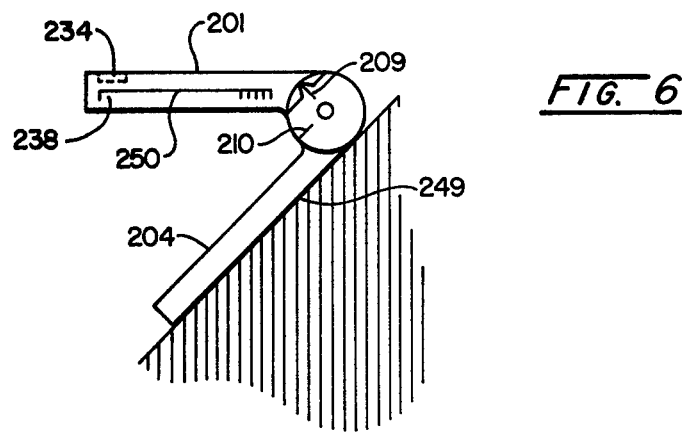
FIG. 6 is a plan view illustrating the use of the embodiment of FIG. 4.
Figure 7:
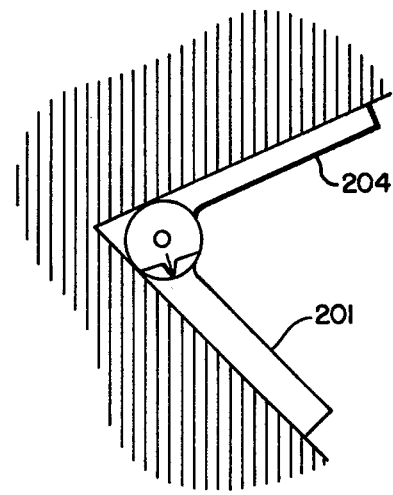
FIG. 7 is a plan view illustrating the use of embodiments of my invention with the interior solid angles.
Figure 8:
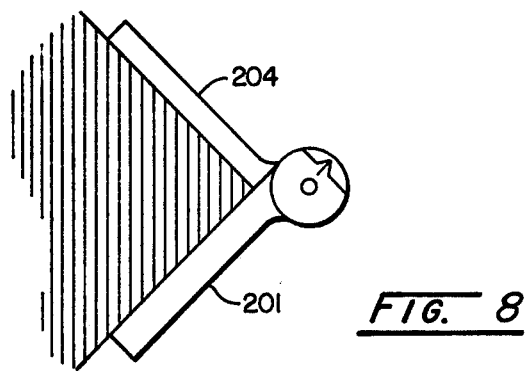
FIG. 8 is a plan view illustrating the use of embodiments of my invention with the exterior solid angles.

FIGS. 4, 5 and 6 illustrate the preferred embodiment which is a modification of the structure of FIGS. 1-3.

The bottom arm 201 of the angle gauge contains an integral scale 208 and an integral pivoting stud 239.

The bottom arm of the angle gauge contains a pitch scale 238.

Preferably, the scale 208 starts at 0° and increases, in a clockwise direction, to 180° in one degree increments and also from the 0° position, increases to 180° in the counter clockwise direction.

The bottom arm of the angle gauge also contains a resilient locking ring 206. The ring-in-groove lock configuration gives a very desirable locking and adjustable drag characteristic.

The top arm 203 contains two scribed indicators 209 and 210 on the bottom surface of the top arm. (The preferred embodiment of the angle gauge is transparent material such as Lexan). This arrangement also minimizes paralax error.

The primary indicator 209 indicates the relative angular position of the top and bottom arms. The secondary indicator 210 indicates the pitch in degrees of the pitch selected on the pitch scale 238.

The top arm attachment 204 of the angle gauge is detachable at the base as shown at the intersection of 203 and 204 and 231.

The angle gauge consists of a level indicator 234, in the bottom arm 201. The function of the level indicator is to allow direct measurement of pitch in degrees which in turn, can be converted to pitch in terms of inches per foot. The pitch in degrees can be read and if the legs of the angle gauge are rotated until the secondary indicator 210 indicates the same pitch in degress (with arms crossed), the intersection of the outer edge 249 and 258 of the top arm 204 or 203 and the base line 250 of the pitch scale 238, indicates the pitch in inches per foot.

A given pitch is set on the angle gauge by adjusting the two arms such that the outer edge 249 or 258 of the top arm crosses the baseline 250 of the pitch scale 238 at the desired pitch. The arms of the angle gauge are automatically positioned such that:

(a) the pitch in degrees is indicated by the secondary indicator 210;

(b) the proper angle to be cut in degrees is indicated by the primary indicator 209; and (c) the arms of the angle gauge are automatically set such that the angle gauge can be placed upon the work and the correct cut angle can be marked or the angle in degrees can be transferred to other tools. (The pitch angle and the cut angle are not equal).

The spacing of the graduations of the pitch scale 238, are determined by the geometry and dimensions of the angle gauge and well known trigonometric functions, in particular, the tangent function.

Previously, it was mentioned the the preferred embodiment of the angle gauge was resin such as Lexan. The reasons are as follows:

(a) Economy of production with high accuracy. If this tool were made of metal each tool would require machining to obtain the required accuracy. If the tool is made of a durable and stable resin such as Lexan, it can be molded, and the machined accuracy is built into the mold.

(b) The angle gauge would be light but durable.

(c) The transparent characteristic is advantageous, in particular when plane angles are to be laid out or measured.

It is to be understood that while the detailed drawings and specific examples given describe preferred embodiments of the invention, they are for the purposes of illustration only, that the apparatus of the present invention is not limited to the precise details and conditions disclosed and that various changes may be made therein without departing from the spirit of the invention which is defined by the following claims.

I claim:

1. An angle gauge comprising:
   (a) A pair of pivotally connected gauging arms, one of said arms having means defining a pivot axis each arm formed with an outwardly facing straight edge spaced radially offset from said pivot axis and pivotally joined at the pivot axis by an adjustable fastener means for at times clamping said arms at a selected relative angle, one of said gauging arms having a pitch scale indicating the tangent of an angle formed along said one arm and the second of said arms having an indicator mark formed thereon wherein the intersection of said pitch scale with an edge of the arm not having the pitch scale occurs at the tangent of the angle on the below recited angle scale which is in registration with said indicator mark;
   (b) a circular angle scale fixed relative to a first one of said arms coaxially with the pivot axis and extending radially outwardly a distance not greater than the least offset of said outwardly facing straight edges; and
   (c) a pointer fixed relative to a second one of said gauging arms and pivotal with said second arm about said pivot axis for indicating a scale reading.

2. A gauge according to claim 1 wherein said indicator mark is displaced 90° from said pointer whereby the angle of the angle scale which is in registration with said pointer and the angle between said gauging arms is the complement of the angle having said tangent.

* * * * *